(12) United States Patent
Ichikawa

(10) Patent No.: US 9,160,934 B2
(45) Date of Patent: Oct. 13, 2015

(54) IMAGE CAPTURING APPARATUS OBTAINING HIGH-EXPOSURE AND LOW-EXPOSURE IMAGES, AND METHOD FOR CONTROLLING THE SAME

(71) Applicant: CANON KABUSHIKI KAISHA, Tokyo (JP)

(72) Inventor: Shigeru Ichikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/175,479

(22) Filed: Feb. 7, 2014

(65) Prior Publication Data
US 2014/0232929 A1    Aug. 21, 2014

(30) Foreign Application Priority Data
Feb. 20, 2013  (JP) .................................. 2013-031428

(51) Int. Cl.
```
H04N 5/335      (2011.01)
H04N 5/235      (2006.01)
H04N 5/232      (2006.01)
H04N 5/355      (2011.01)
G06T 5/50       (2006.01)
G06T 7/20       (2006.01)
```
(52) U.S. Cl.
CPC ............... *H04N 5/2355* (2013.01); *G06T 5/50* (2013.01); *G06T 7/2033* (2013.01); *H04N 5/23254* (2013.01); *H04N 5/35554* (2013.01); *G06T 2207/10144* (2013.01); *G06T 2207/20208* (2013.01)

(58) Field of Classification Search
CPC ...................................................... H04N 5/2355

USPC ............................................. 348/229.1, 230.1
See application file for complete search history.

(56) References Cited

U.S. PATENT DOCUMENTS

| | | | | |
|---|---|---|---|---|
| 8,570,421 | B2* | 10/2013 | Okada et al. .................. 348/311 |
| 2009/0244350 | A1* | 10/2009 | Wada ............................. 348/311 |
| 2009/0262215 | A1* | 10/2009 | Sano et al. .................. 348/229.1 |
| 2011/0069205 | A1* | 3/2011 | Kasai et al. ................... 348/239 |
| 2012/0287294 | A1* | 11/2012 | Kaizu et al. ................ 348/208.4 |
| 2013/0076973 | A1* | 3/2013 | Kobayashi .................... 348/362 |

FOREIGN PATENT DOCUMENTS

| | | |
|---|---|---|
| JP | 06-141229 A | 5/1994 |
| JP | 2011-244309 A | 12/2011 |

* cited by examiner

*Primary Examiner* — Twyler Haskins
*Assistant Examiner* — Dwight C Tejano
(74) *Attorney, Agent, or Firm* — Cowan, Liebowitz & Latman, P.C.

(57) ABSTRACT

There is provided an image capturing apparatus. An image capturing control unit performs image capturing using a first pixel group of an image capturing unit during a first exposure time to obtain a high-exposure image. It also performs image capturing using a second pixel group of the image capturing unit during a second exposure time which is shorter than the first exposure time to obtain a first low-exposure image. It also performs image capturing using the second pixel group during a third exposure time which is shorter than the first exposure time to obtain a second low-exposure image. The second and third exposure times at least partially overlapping the first exposure time. A detection unit compares the first low-exposure image with the second low-exposure image to detect a motion of the subject.

14 Claims, 13 Drawing Sheets

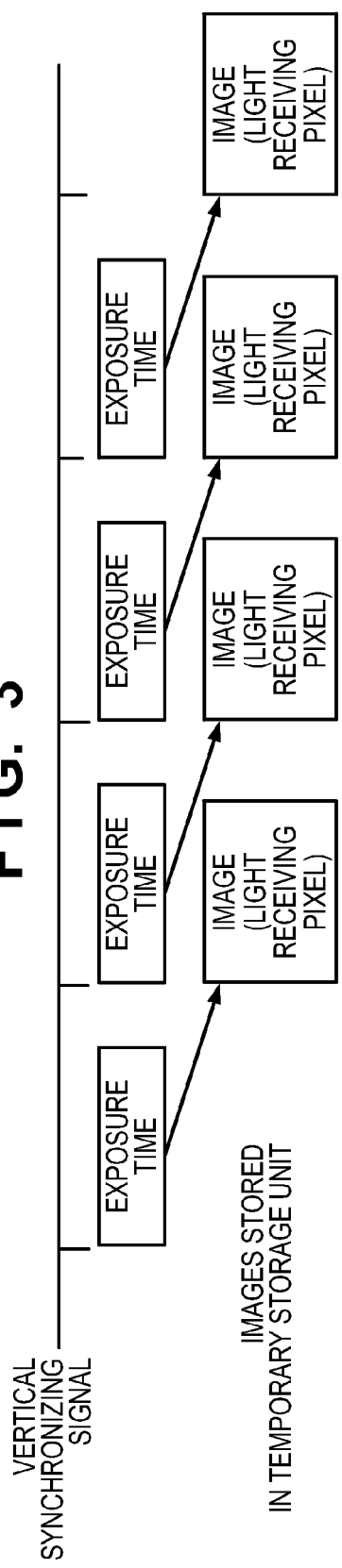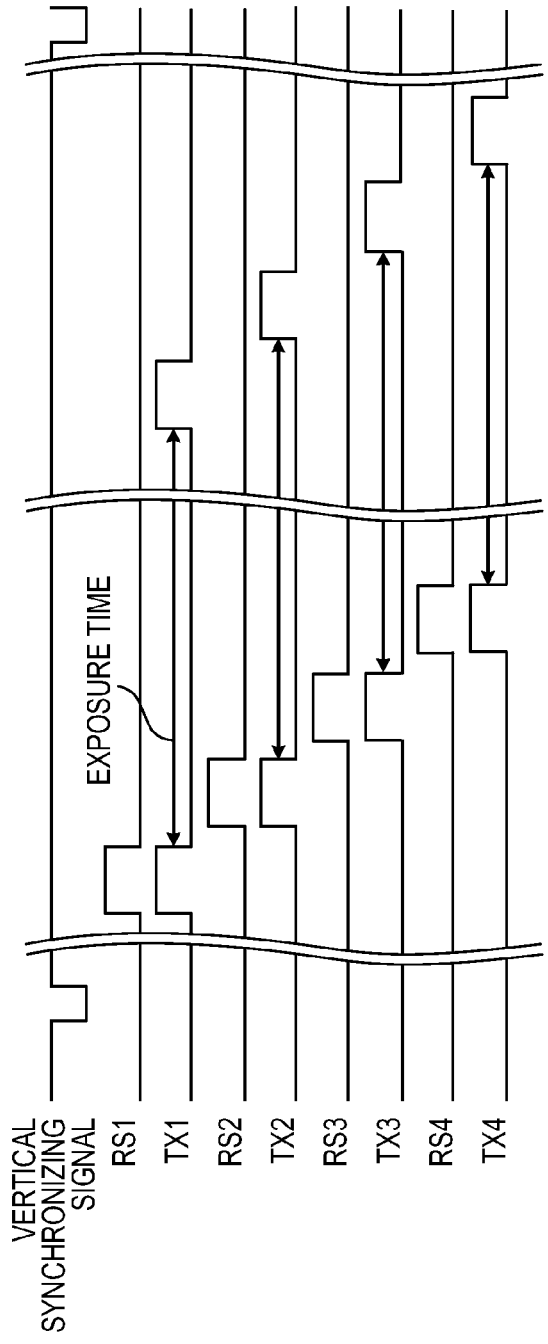

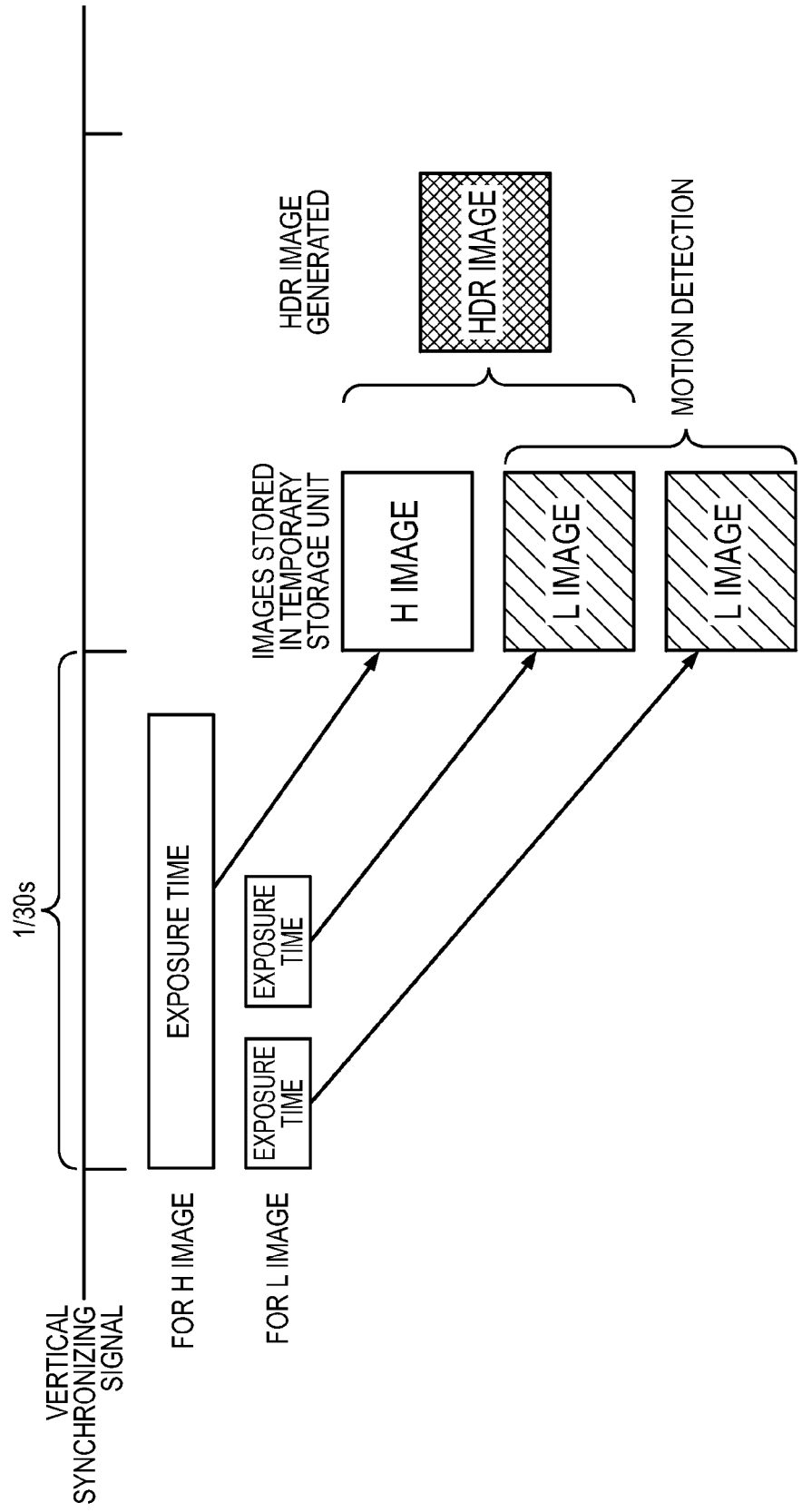

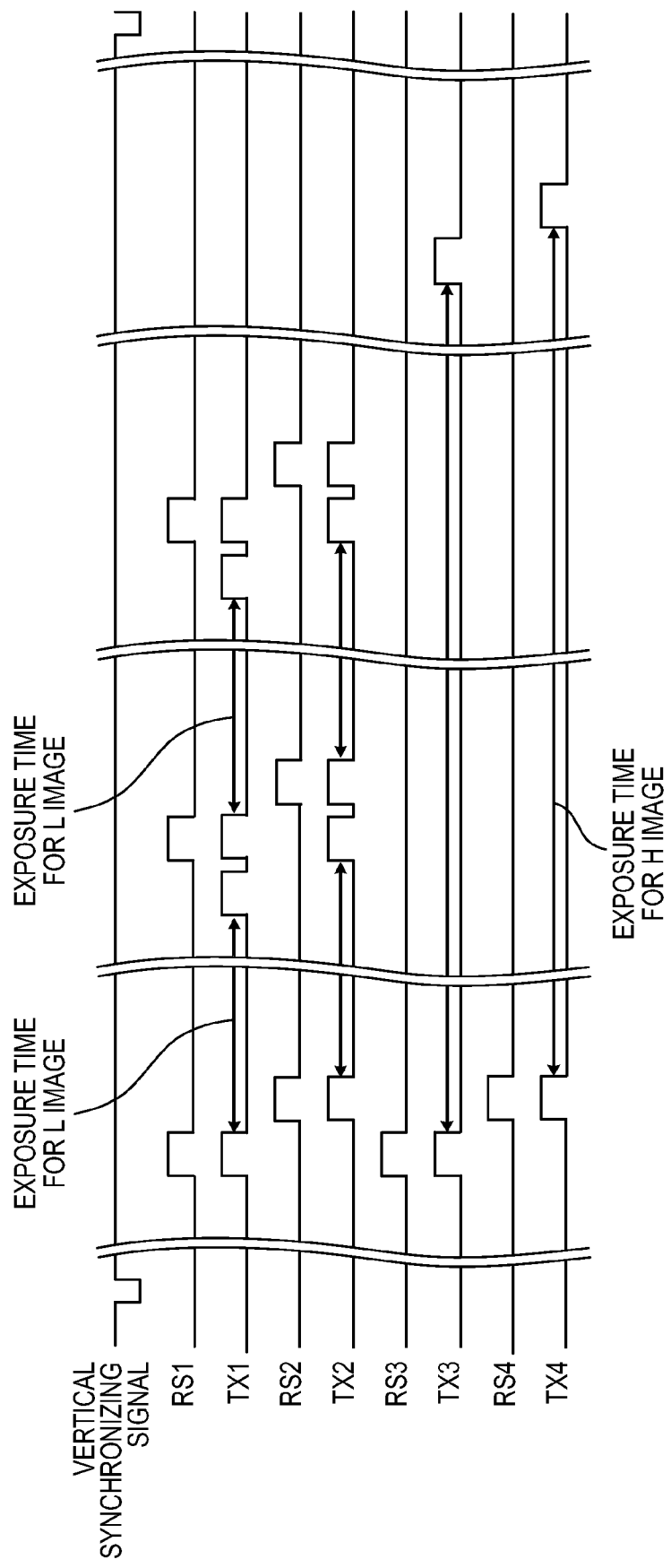

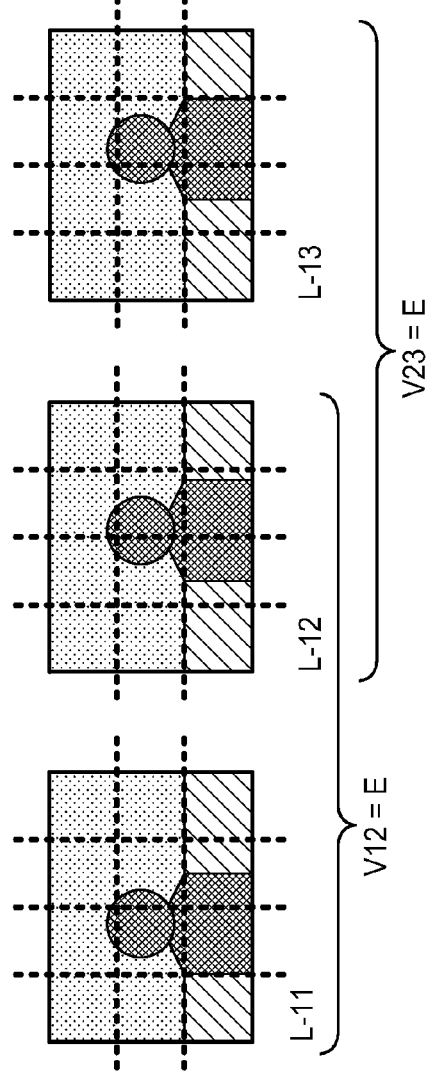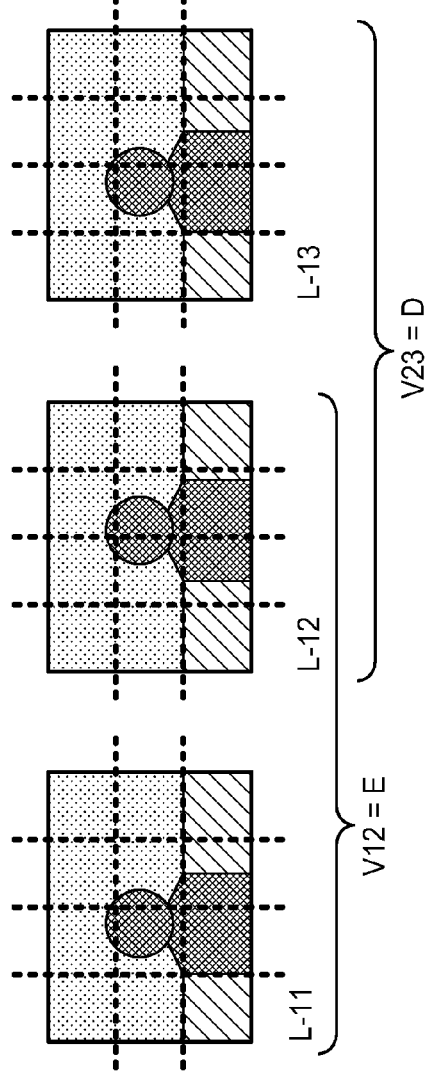

IMAGE CAPTURING APPARATUS OBTAINING HIGH-EXPOSURE AND LOW-EXPOSURE IMAGES, AND METHOD FOR CONTROLLING THE SAME

BACKGROUND OF THE INVENTION

1. Field of the Invention

The present invention relates to an image capturing apparatus and a method for controlling an image capturing apparatus.

2. Description of the Related Art

Solid-state image sensing devices including a CCD or a CMOS image sensor, which are used to capture still images or moving images, are known to have a dynamic range (the ratio of the minimum luminance and the maximum luminance between which tones can be distinguished) which is generally narrower than that of the human eye. Therefore, the problem arises that it is difficult to reproduce tones which are actually viewed by the human eye faithfully in a photograph. To address the problem, there is a known technique of composing a plurality of differently exposed images (an overexposed image (i.e., a light image, hereinafter referred to as an "H image"), a correct-exposure image (hereinafter referred to as an "M image"), an underexposed image (i.e., a dark image, hereinafter referred to as an "L image"), etc.) together to obtain an image having a wider dynamic range (hereinafter referred to as "HDR") than that of standard imaging capturing. Japanese Patent Laid-Open No. 6-141229 describes an example HDR technique.

According to conventional HDR techniques, after the beginning of shooting, a plurality of differently exposed images (e.g., an H image, an M image, and an L image, i.e., a total of three images) are successively captured. Thereafter, the images are composed together, so that HDR can be achieved by a difference in exposure between the H and L images. In such an HDR technique, however, the images to be composed are captured at different timings, and therefore, a problem arises with the composition of the images if a subject is moving.

To solve this problem, there is a known technique of dividing a picture plane into a plurality of regions, and performing image capturing while changing exposure on a region basis to obtain differently exposed images of each region, thereby reducing a difference between timings at which a plurality of images to be composed (see Japanese Patent Laid-Open No. 2011-244309). According to Japanese Patent Laid-Open No. 2011-244309, the exposure time of the image sensing device can be controlled on a row basis so that a light H image is generated from an overexposed row and a dark L image is generated from an underexposed row. The row to be overexposed and the row to be underexposed can be exposed in parallel, and therefore, the difference between timings at which the H and L images are obtained is reduced.

When L and H images are generated according to the technique of Japanese Patent Laid-Open No. 2011-244309 supra, two or more L images can be generated while one H image is generated because the exposure time of an L image is shorter than that of an H image. (Exactly speaking, if the exposure time of an L image is longer than half the exposure time of an H image, the exposure of the second L image is not completed by the time the exposure of the H image is completed. Even in this case, however, the exposure of the second L image is completed soon after the completion of the exposure of the H image. Therefore, roughly speaking, two or more L images can be generated while one H image is generated.) In Japanese Patent Laid-Open No. 2011-244309, for example, two or more L images which are generated while one H image is generated are utilized so that one H image and two or more L images are composed together.

Incidentally, the first and second L images are obtained at different timings, and therefore, there may be a motion of a subject between the first and second L images. At present, however, there is not a proposal for utilization of two or more L images with attention given to that point.

SUMMARY OF THE INVENTION

With the foregoing circumstances in mind, the present invention has been made. The present invention provides a novel technique of utilizing two low-exposure images which are obtained using a predetermined group of pixels of an image sensing device at a timing when a high-exposure image is obtained using another predetermined group of pixels. As used herein, the terms "high-exposure image" and "low-exposure image" only mean relative degrees of exposure. Therefore, a high-exposure image does not necessarily mean overexposure, and a low-exposure image does not necessarily mean underexposure.

According to an aspect of the present invention, there is provided an image capturing apparatus comprising: an image capturing unit configured to capture an image of a subject; an image capturing control unit configured to perform image capturing using a first pixel group of the image capturing unit during a first exposure time to obtain a high-exposure image, perform image capturing using a second pixel group of the image capturing unit during a second exposure time which is shorter than the first exposure time to obtain a first low-exposure image, and perform image capturing using the second pixel group during a third exposure time which is shorter than the first exposure time to obtain a second low-exposure image, the second and third exposure times at least partially overlapping the first exposure time; and a detection unit configured to compare the first low-exposure image with the second low-exposure image to detect a motion of the subject.

According to another aspect of the present invention, there is provided a control method for an image capturing apparatus including an image capturing unit for capturing an image of a subject, comprising: an image capturing control step of performing image capturing using a first pixel group of the image capturing unit during a first exposure time to obtain a high-exposure image, performing image capturing using a second pixel group of the image capturing unit during a second exposure time which is shorter than the first exposure time to obtain a first low-exposure image, and performing image capturing using the second pixel group during a third exposure time which is shorter than the first exposure time to obtain a second low-exposure image, the second and third exposure times at least partially overlapping the first exposure time; and a detection step of comparing the first low-exposure image with the second low-exposure image to detect a motion of the subject.

Further features of the present invention will become apparent from the following description of exemplary embodiments with reference to the attached drawings.

BRIEF DESCRIPTION OF THE DRAWINGS

FIG. 3 is a timing chart where a normal image is obtained using the image capturing apparatus 100.

FIG. 4 is a timing chart showing signals which are generated from a vertical drive circuit 206 when a normal image is obtained using the image capturing apparatus 100.

FIG. 5 is a timing chart where an HDR image is obtained using the image capturing apparatus 100 according to the first embodiment.

FIG. 6 is a timing chart showing signals which are generated from the vertical drive circuit 206 when images for generating an HDR image are obtained using the image capturing apparatus 100 according to the first embodiment.

FIGS. 15A and 15B are diagrams illustrating changes in the direction of a motion of a subject in the third embodiment.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
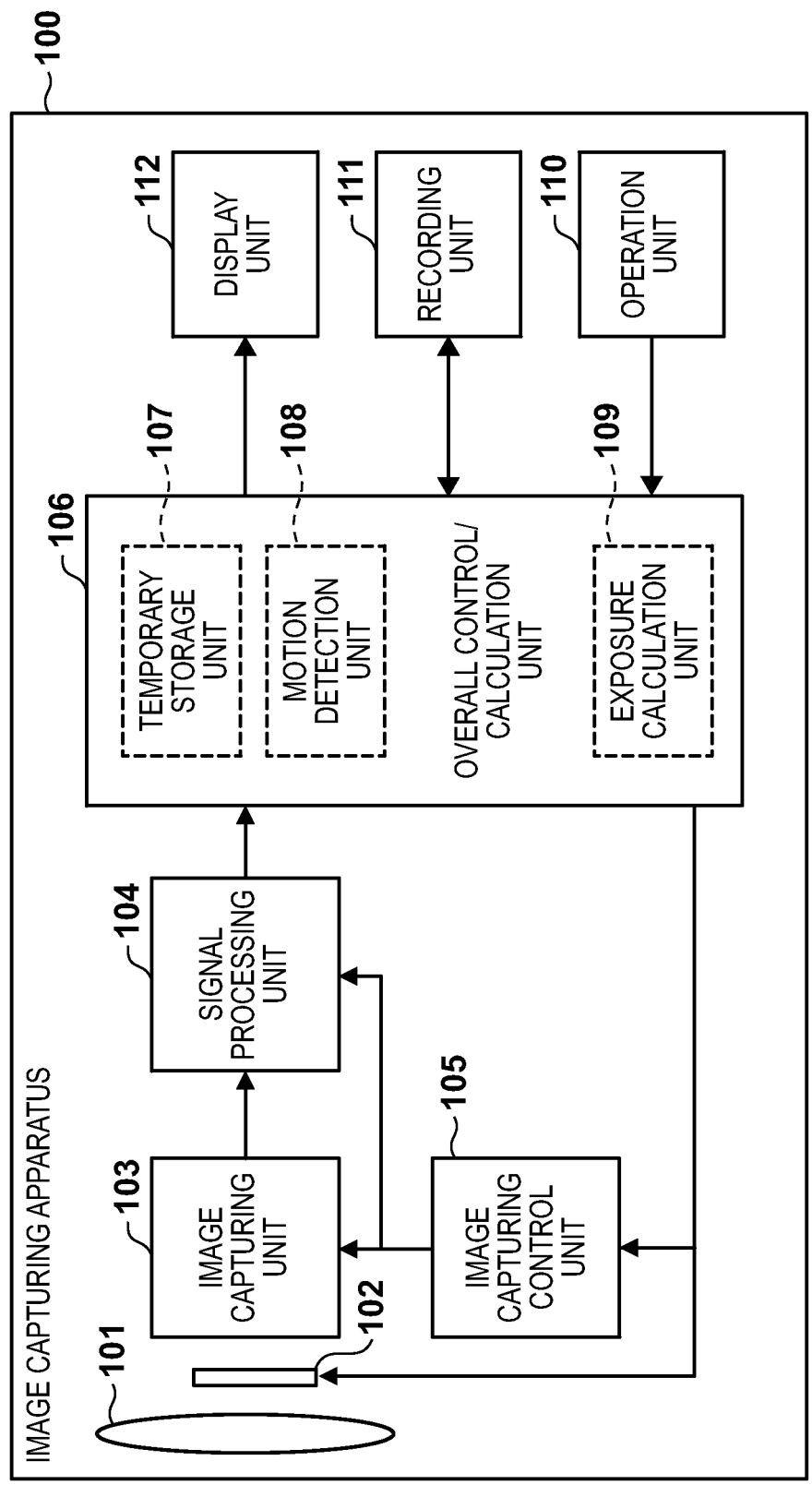
FIG. 1 is a block diagram showing a configuration of an image capturing apparatus 100 according to a first embodiment.

FIG. 1 is a block diagram showing a configuration of an image capturing apparatus 100 according to a first embodiment. The image capturing apparatus 100 is, for example, a digital camera. A lens unit 101 condenses light from a subject to an image capturing unit 103. The lens unit 101 includes a focal length changing unit, a light blocking unit which blocks incident light, etc. A light amount adjustment unit 102 is provided between the lens unit 101 and the image capturing unit 103. The light amount adjustment unit 102 includes, for example, a mechanism for inserting a light attenuation filter, and a diaphragm mechanism. The image capturing unit 103 includes a pixel unit which converts incident light which has passed through the lens unit 101 and the light amount adjustment unit 102 into an analog electrical signal, an A/D conversion circuit which converts the analog electrical signal into a digital signal, etc.

A signal processing unit 104 generates correction parameters for a pixel signal input from the image capturing unit 103, and performs necessary image signal correction processes on the pixel signal. An image capturing control unit 105 generates, based on an input signal from an overall control/calculation unit 106, a timing signal, a signal for setting a gain for amplifying a video signal, a signal for setting an exposure time, and signals for other controls, which are required by the image capturing unit 103, the signal processing unit 104, etc.

The overall control/calculation unit 106 performs a process and calculation according to an operation of the image capturing apparatus 100. The overall control/calculation unit 106 includes a temporary storage unit 107 which temporarily stores a signal from the signal processing unit 104 etc., a motion detecting unit 108 which detects a moving subject in a picture plane based on a signal from the image capturing unit 103, and an exposure calculation unit 109 which determines exposure conditions. Based on the calculation result of the exposure calculation unit 109, the overall control/calculation unit 106 adjusts the amount of light using the light amount adjustment unit 102, or adjusts the exposure time or a gain for amplifying a video signal using the image capturing control unit 105.

In this embodiment, the signal processing unit 104 is separated from the overall control/calculation unit 106. Alternatively, the signal processing unit 104 may be included in the overall control/calculation unit 106 or the image capturing unit 103. The image capturing control unit 105 may be included in the image capturing unit 103.

An operation unit 110 includes a human interface, such as a button, a dial, etc. The user inputs an operation command to the image capturing apparatus 100 using the operation unit 110. A recording unit 111 records image data generated by the overall control/calculation unit 106 to a recording medium. A display unit 112 displays image data which is generated by the overall control/calculation unit 106 based on a signal from the signal processing unit 104, an icon corresponding to a command input from the operation unit 110, etc.

Figure 2:
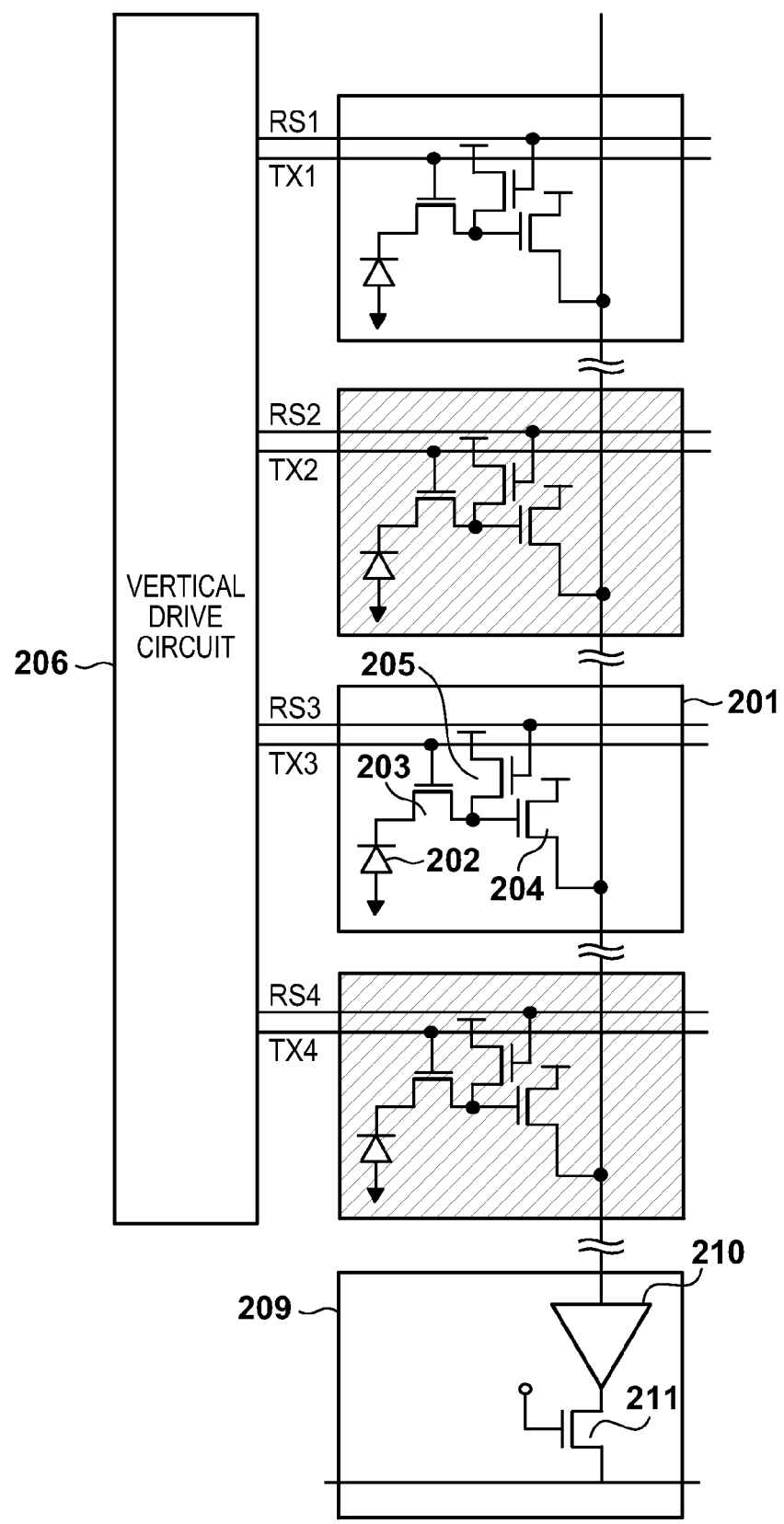
FIG. 2 is a diagram showing a configuration of an image sensing device included in an image capturing unit 103.

Next, a configuration of an image sensing device included in the image capturing unit 103 is shown in FIG. 2. A light receiving pixel unit 201 receives light from the lens unit 101, performs photoelectric conversion on the light entering a surface thereof, and outputs a resultant electrical signal. The light receiving pixel unit 201 is, as one unit (pixel), composed of a photodiode 202, a transfer transistor 203, a signal amplifier 204, and a reset transistor 205. The image capturing unit 103 includes a plurality of the light receiving pixel units (pixels) 201, which are two-dimensionally arranged.

The transfer transistor 203 and the reset transistor 205 are operated based on a signal from a vertical drive circuit 206 included in the image sensing device. Here, the vertical drive circuit 206 includes a shift register, a signal generation circuit which drives each pixel, etc. Due to controlling the transfer transistors 203 and the reset transistors 205 by timing signals (TX1 to TX4, RS1 to RS4, etc.), the exposure times can be controlled by resetting or reading charge of the photodiodes 202.

A horizontal drive circuit 209 includes a shift register (not shown), a column amplifier circuit and A/D conversion circuit 210, a signal output selection switch 211, an output circuit (not shown), etc. Here, by changing settings of the column amplifier circuit and A/D conversion circuit 210 based on a signal from the image capturing control unit 105, a signal read from a pixel can be amplified.

Next, a process of obtaining a normal image using the image capturing apparatus 100 will be described. FIG. 3 is a timing chart where a normal image is obtained using the image capturing apparatus 100. Exposure and signal reading are performed based on a vertical synchronizing signal generated by the overall control/calculation unit 106 or the image capturing control unit 105.

FIG. 4 is a timing chart showing a signal which is generated by the vertical drive circuit 206 when a normal image is obtained using the image capturing apparatus 100. When a signal TX and a signal RS rise, charge of the photodiode 202 is reset, and exposure begins. This operation is performed on the light receiving pixel units 201 successively in a predetermined sequence under conditions set by the image capturing control unit 105. Thereafter, after a predetermined exposure time has passed, the signal TX rises again, and charge of the photodiode 202 is read out to the signal amplifier 204. A video signal is generated based on a signal from the signal amplifier 204, and output through the horizontal drive circuit 209. This operation is also performed under conditions set by the image capturing control unit 105.

The image sensing device included in the image capturing apparatus 100 of this embodiment is of the CMOS type. Therefore, the shift register included in the vertical drive circuit 206 can be set to determine which rows of the transfer transistors 203 are to be driven in what sequence. Also, the same row can be repeatedly selected to read a signal. The shift register included in the horizontal drive circuit 209 can be set to determine in which column the signal output selection switch 211 is to be operated to read a signal, i.e., which of the signals in the same row is to be selected and output. Therefore, it can be determined which pixels in the pixel array are to be read in what sequence. Read signals are subjected to a correction process in the signal processing unit 104. Thereafter, the overall control/calculation unit 106 generates a final image.

Next, a process of detecting a motion of a subject using the image capturing apparatus 100 will be described. The motion detection process of this embodiment utilizes two low-exposure images (L images) using a predetermined group of pixels (second pixel group) of the image sensing device at a timing when a high-exposure image (H image) is obtained using another predetermined group of pixels (first pixel group). As used herein, the terms "H image" and "L image" only mean relative degrees of exposure. Therefore, an H image does not necessarily mean overexposure, and an L image does not necessarily mean underexposure. For example, an H image may be a correct-exposure image.

The motion detection process in the context of generating a high-dynamic-range (HDR) image will now be described, assuming that a high-exposure image and a low-exposure image are composed together based on the result of motion detection to generate an HDR image. However, the generation of an HDR image is not essential for the motion detection process of this embodiment. It may not be necessary to generate an HDR image, following the motion detection process, and the motion detection result may be utilized for any purposes in addition to the process of generating an HDR image. For example, the image capturing apparatus 100 may capture and record a correct-exposure image as an H image to the recording unit 111, detect a motion of a subject from two L images, and record the motion detection result to the header of the H image. The motion detection result thus recorded may be used later, for example, when an image correction process is performed, etc.

FIG. 5 is a timing chart where, in the first embodiment, an HDR image is obtained using the image capturing apparatus 100. Although, in FIG. 5, it is assumed that a moving image of 30 fps is obtained, this embodiment is also applicable when a still image is obtained instead of a moving image. The frame rate is not limited to 30 fps even when a moving image is obtained.

In this embodiment, for the image sensing device of the image capturing unit 103, exposure conditions for obtaining an L image and exposure conditions for obtaining an H image can be set alternately in groups of two rows. In general, the pixel groups of the image sensing device belong to the pixel groups for obtaining an L image or the pixel groups for obtaining an H image alternately in groups of a predetermined number of rows. The assignment of the pixel groups is not limited to this. The image capturing operation itself is performed at an image capturing rate of 30 fps based on a vertical synchronizing signal which is generated every 1/30 sec by the overall control/calculation unit 106. A captured image which is output from each row by the image sensing device after a predetermined exposure time has passed, is temporarily stored in the temporary storage unit 107. After a set of L images and H images has been prepared, the overall control/calculation unit 106 composes the L and H images together to generate an HDR image.

In a row for an L image, exposure and read operation are performed two times to obtain two L images during an exposure time for a row for an H image. Note that two exposure times for L images are not necessarily completely included in one exposure time for an H image, but exposure for obtaining an L image may be performed two times at timings which allow the two exposure times for L images to at least partially overlap one exposure time for an H image. Therefore, the second exposure may not be completed during the exposure time for an H image, and the first exposure may begin at a timing different from the timing when the exposure for an H image begins. The two exposure times for an L image may have different lengths, and exposure may be performed three or more times in a row for an L image during one exposure time for an H image to obtain three or more L images. A plurality of L images thus obtained are used by the motion detecting unit 108 to detect a region of a picture plane in which an image of a moving subject has been captured, in addition to generation of an HDR image. The detection result of the motion detecting unit 108 may be, for example, used to align the H and L images during composition of these images. When an HDR image is generated, the first L image may be used, the second L image may be used, or both of the first and second L images may be used. When three or more L images are generated, any number of L images may be used.

FIG. 6 is a timing chart showing signals which are generated by the vertical drive circuit 206 when images for generating an HDR image are obtained in the image capturing apparatus 100 according to the first embodiment. When a signal TX and a signal RS rise, charge of the photodiode 202 is reset, and exposure begins. This operation is performed on the light receiving pixel units 201 successively in a predetermined sequence under conditions set by the image capturing control unit 105. Thereafter, in a row for an L image, after a predetermined exposure time (second exposure time) has passed, signals TX1 and TX2 successively rise. As a result, charge of the photodiode 202 is read out to the signal amplifier 204, and output through the horizontal drive circuit 209, and therefore, the first L image (first low-exposure image) is obtained. Thereafter, signals RX1 and RX2 successively rise, and the row for an L image is reset. Thereafter, similarly, after a predetermined exposure time for an L image (third exposure time, which may be equal to or different from the second exposure time) has passed, the signals TX1 and TX2 successively rise. As a result, charge of the photodiode 202 is read out to the signal amplifier 204, and output through the horizontal drive circuit 209, and therefore, the second L image (second low-exposure image) is obtained. Thereafter, after a predetermined exposure time (first exposure time) for an H image has passed, signals TX3 and TX4 successively rise, and charge of the photodiode 202 is read out to the signal amplifier 204, and output through the horizontal drive circuit 209, and therefore, an H image is obtained.

Figure 7:
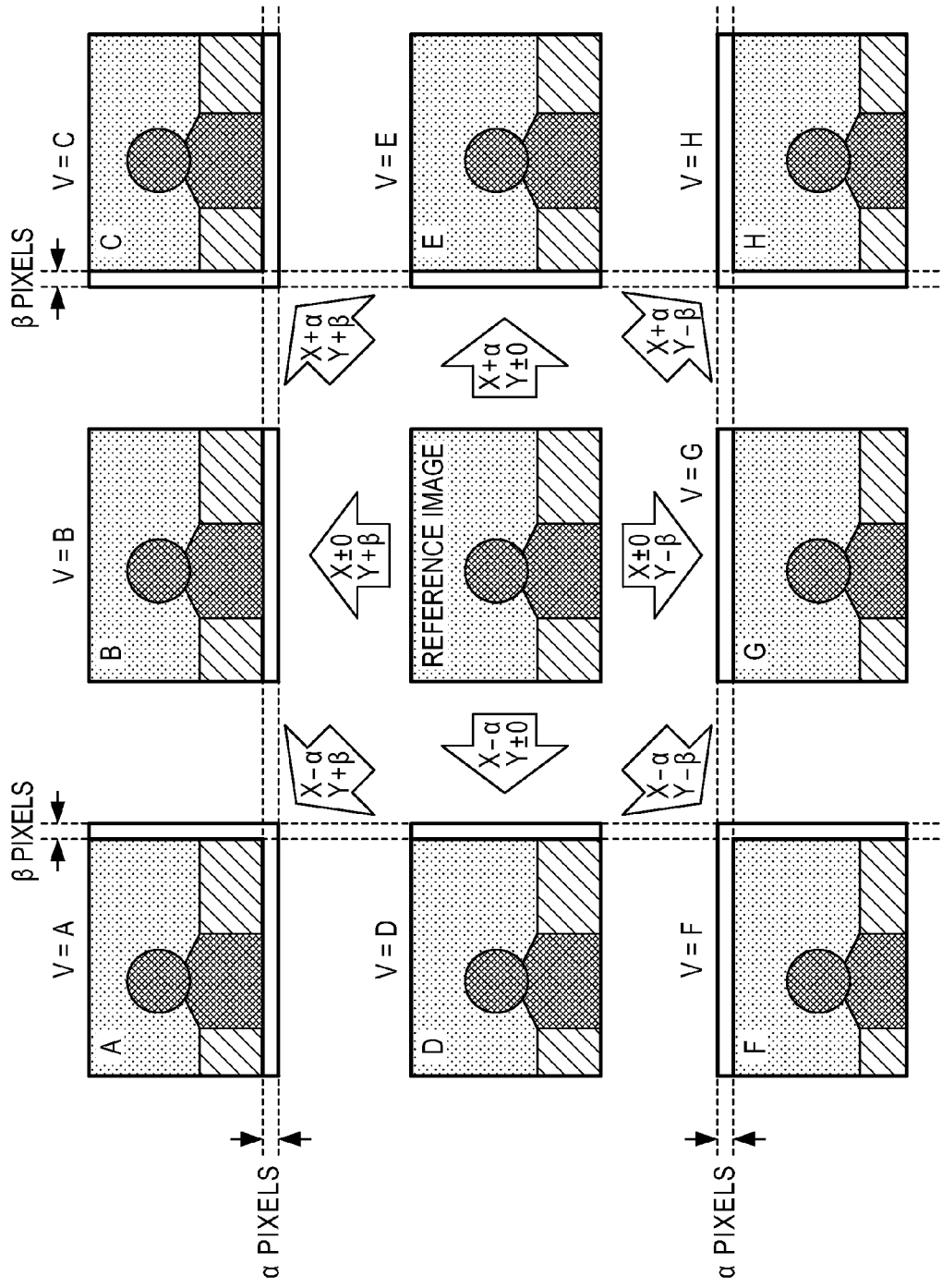
FIG. 7 is a diagram showing an example method for detecting a motion of a subject based on two L images using a motion detecting unit 108.

Next, a method for comparing two L images using the motion detecting unit 108 to detect a motion of a subject will be described with reference to FIG. 7. Initially, the motion detecting unit 108 calculates a difference between two L images in order to determine whether or not there is a motion of a subject between the two L images. This calculation is achieved by:

$$\text{Diff} = \Sigma |L_2(x,y) - L_1(x,y)| \quad \text{Equation (1)}$$

where $L_N(x, y)$ represents a pixel value at the coordinates (x, y) of the Nth L image. Therefore, the difference Diff of the entire image is the sum of differences of all pixels.

If Diff is less than a threshold Th, the motion detecting unit 108 determines that there is not a motion of a subject. If Diff is not less than the threshold Th, the motion detecting unit 108 determines that there is a motion of a subject. If there is a motion, as shown in FIG. 7 the motion detecting unit 108 calculates a direction of the motion by calculating a difference between a reference image and an image which is shifted in the horizontal and vertical directions by a predetermined number of pixels (in this embodiment, α pixels in the horizontal direction and β pixels in the vertical direction). Here, the reference image is the second L image, and images A to H are those which are obtained by shifting the first L image. The motion detecting unit 108 designates a direction V of an image having a smallest difference as the direction of the motion of the subject. Here, there are eight directions V, which are indicated by A to H. There are the following relationships: A=−H, B=−G, C=−F, and D=−E.

An entire picture plane may be divided into a plurality of regions, the above motion detection process may be performed on each region, and the presence or absence and the direction of a motion may be determined for each region, whereby the accuracy of the detection can be increased. When three or more L images are obtained, the motion detecting unit 108 may perform motion detection based on the three or more L images. The motion detecting unit 108 may perform motion detection using an H image in addition to L images.

Figure 8:
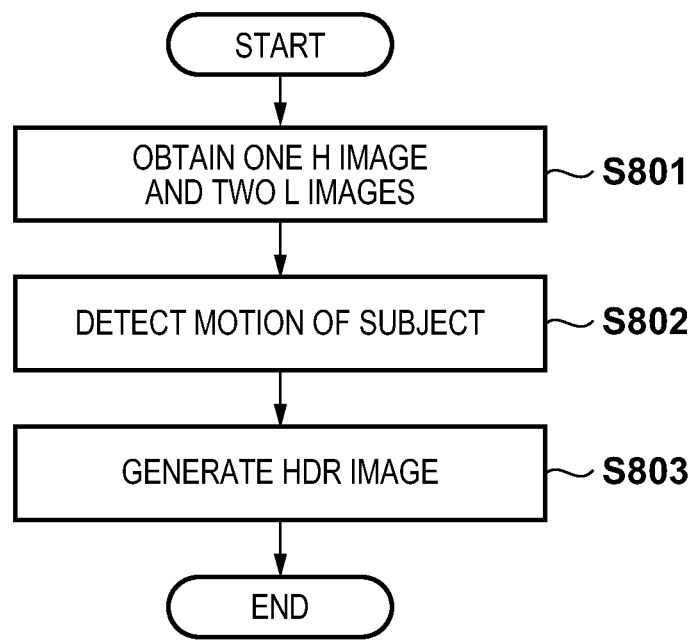
FIG. 8 is a flowchart showing a motion detection process and an HDR image generation process according to the first embodiment.

FIG. 8 is a flowchart showing the motion detection process and the HDR image generation process of the first embodiment. In step S801, the overall control/calculation unit 106 of the image capturing apparatus 100 controls the image capturing control unit 105 to obtain one H image and two L images. In step S802, the motion detecting unit 108 compares the two L images obtained in step S801 to detect a motion of a subject. In step S803, the overall control/calculation unit 106 composes the H image and one (or both) of the two L images which have been obtained in step S801 together, based on the motion of the subject detected in step S802, to generate an HDR image. Thus, the motion detection process and the HDR image generation process are completed.

As described above, in this embodiment, the image capturing apparatus 100 attempts to detect a motion of a subject based on two L images which are obtained using a predetermined group of pixels of an image sensing device at a timing when an H image is obtained using another predetermined group of pixels. Therefore, in this embodiment, two L images thus obtained are utilized for motion detection.

In this embodiment, an exposure difference between an H image and an L image is derived from a difference in exposure time. The exposure difference may be produced using a combination of amplification units employing the light amount adjustment unit 102 or the image capturing control unit 105, etc.

Second Embodiment

In the first embodiment, an HDR image is generated in the same frame. In this case, the difference between timings at which H and L images are obtained decreases, whereby a decrease in image quality which occurs when there is a motion of a subject can be reduced or prevented. However, H and L images are obtained from different pixel groups of an image sensing device, and therefore, the problem arises that image quality decreases for a subject having a high spatial frequency. Therefore, when an image of a subject having a small motion is captured, then if the same pixel group is used to obtain H and L images at successive timings to generate an HDR image, a decrease in image quality can be further reduced or prevented. Therefore, in a second embodiment, a technique of changing images based on which an HDR image is to be generated, depending on the degree of a motion of a subject, will be described. Note that, in the second embodiment, an image capturing apparatus 100 has a basic configuration etc. similar to those of the first embodiment (see FIG. 1). Differences from the first embodiment will now be described.

Figure 9:
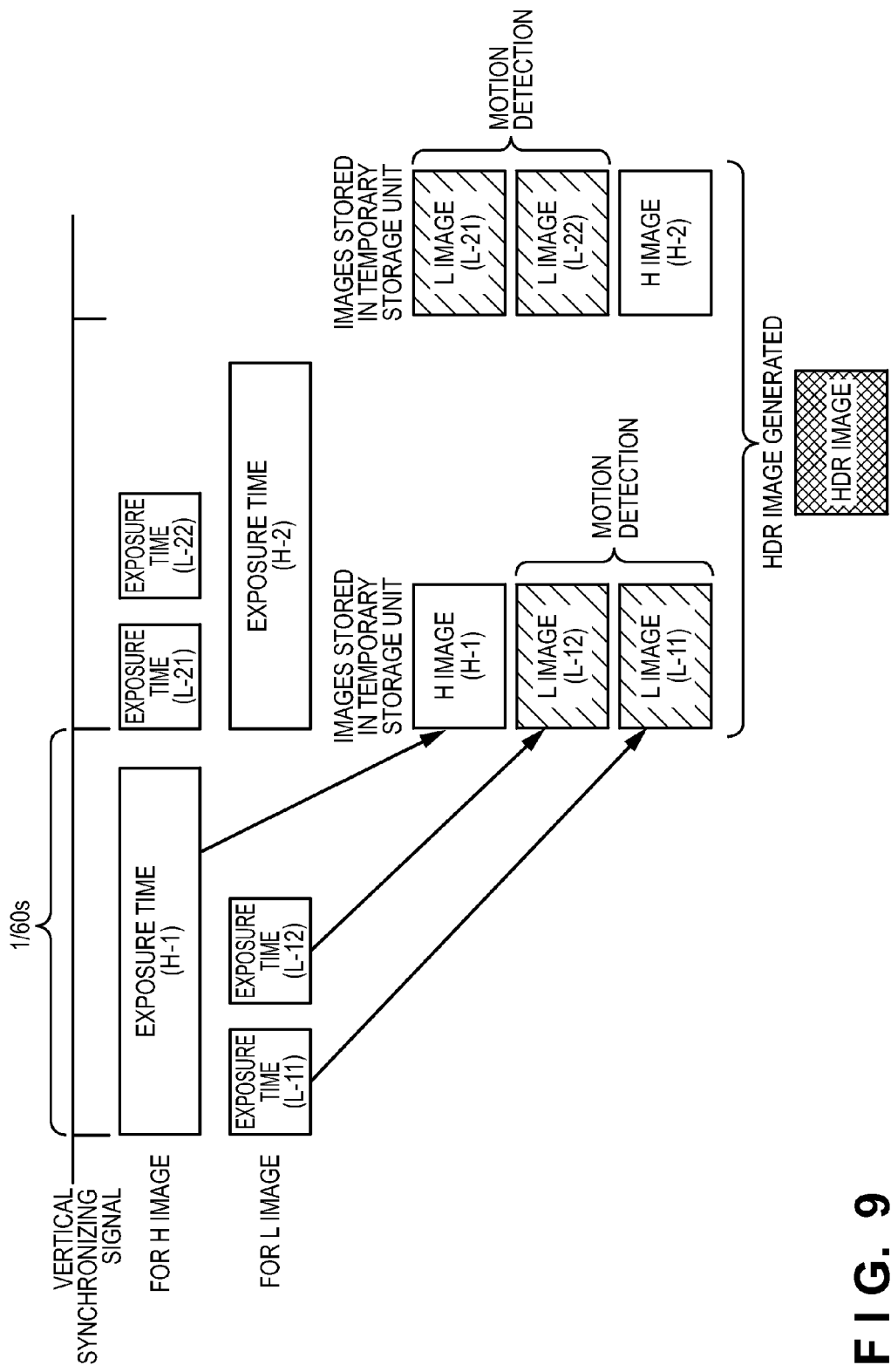
FIG. 9 is a timing chart where an HDR image is obtained using an image capturing apparatus 100 according to a second embodiment.

FIG. 9 is a timing chart where, in the second embodiment, the image capturing apparatus 100 is used to obtain an HDR image. As in the first embodiment, in the image sensing device of the image capturing unit 103, exposure conditions for obtaining an L image and exposure conditions for obtaining an H image can be set alternately in groups of two rows. The image capturing operation itself is performed at an image capturing rate of 60 fps based on a vertical synchronizing signal which is generated every 1/60 sec by the overall control/calculation unit 106. A captured image which is output from each row by the image sensing device after a predetermined exposure time has passed, is temporarily stored in the temporary storage unit 107.

In the second embodiment, unlike the first embodiment, a row for obtaining an L image and a row for obtaining an H image are swapped every time a vertical synchronizing signal is generated. Therefore, in the image capturing apparatus 100, after an H image has been obtained, a pixel group (first pixel group) which was used to generate the H image is used to obtain the third L image (third low-exposure image) and the fourth L image. An exposure time (fourth exposure time) for the third L image may be the same as or different from the exposure times for the first, second, and fourth L images.

When a predetermined number of L images for motion detection have been obtained, the motion detecting unit 108 attempts to detect a motion of a subject. Thereafter, based on the detection result of the motion detecting unit 108, the overall control/calculation unit 106 selects an L image which is to be composed with an H image. Specifically, the overall control/calculation unit 106 selects an L image (the first or second L image) which was obtained during the same vertical synchronizing signal during which an H image was obtained, or an L image (the third or fourth L image) which was obtained during the next vertical synchronizing signal.

Figure 10:
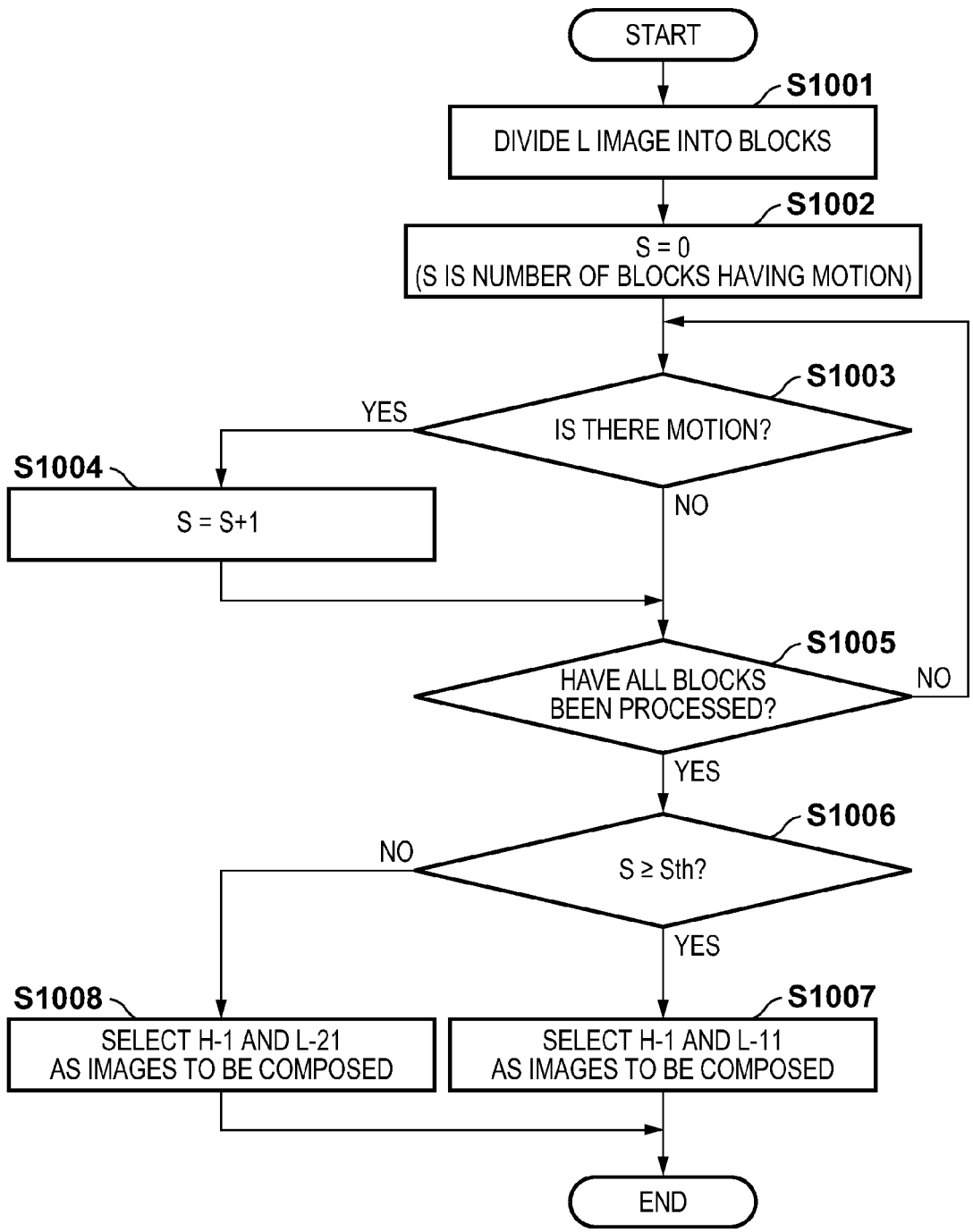
FIG. 10 is a flowchart showing a process of selecting an image which is used to generate an HDR image based on the result of motion detection according to the second embodiment.
Figure 11:
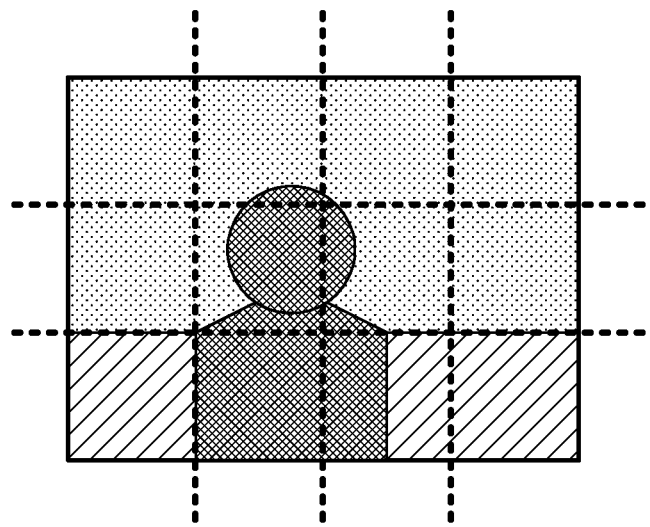
FIG. 11 is a diagram showing how an L image on which motion detection is to be performed is divided into a plurality of blocks.

FIG. 10 is a flowchart showing a process of selecting images which are used to generate an HDR image, using the result of motion detection. In step S1001, as shown in FIG. 11, the motion detecting unit 108 divides L images (L-11 and L-12) on which motion detection is to be performed, into plurality of blocks. In step S1002, the motion detecting unit 108 initializes a variable S which is a counter for counting blocks having a motion to zero. In step S1003, the motion detecting unit 108 determines whether or not there is a motion in the first block (e.g., a block in the upper left corner in FIG. 11). The determination in step S1003 may be, for example, performed based on Equation (1) described in the first embodiment (note that, in this case, Diff is a difference related to only a block to be processed instead of an entire L image). If the determination in step S1003 is positive, in step S1004 the motion detecting unit 108 increases the variable S by one. In step S1005, the motion detecting unit 108 determines whether or not all blocks have been processed. If the determination result in step S1005 is negative, control returns to step S1003, in which the next block is processed. In other words, the motion detecting unit 108 compares L images (L-11 and L-12) on which motion detection is performed, in blocks of a predetermined size, to detect a motion of a subject in each block.

In step S1006, the overall control/calculation unit 106 determines whether or not the result of counting (the variable S) is not less than a predetermined threshold (Sth). If S≥Sth, control proceeds to step S1007. Otherwise (i.e., the number of blocks in which a motion of a subject has been detected is less than the threshold), control proceeds to step S1008.

In step S1007, the overall control/calculation unit 106 selects, as images to be composed together, the first H image (H-1) and an L image (L-11) which has been obtained during the same vertical synchronizing signal during which that H image has been obtained. Therefore, if S≥Sth (i.e., there is a large motion of a subject), an intra-frame HDR image generation process is performed.

On the other hand, in step S1008, the overall control/calculation unit 106 selects, as images to be composed together, the first H image (H-1) and an L image (L-21) which has been obtained during the next vertical synchronizing signal. Therefore, if S<Sth (i.e., there is only a small or no motion of a subject), an inter-frame HDR image generation processes is performed.

Note that, as in the first embodiment, in step S1007, the L image L-12 may be selected, or both of the L images L-11 and L-12 may be selected. This holds true for step S1008.

As described above, in this embodiment, the image capturing apparatus 100 switches between the intra-frame HDR image generation process and the inter-frame HDR image generation process, depending on the result of motion detection of a subject. As a result, the image quality of an HDR image can be improved. Note that the selection process of FIG. 10 is only for illustrative purposes. Alternatively, for example, the image capturing apparatus 100 may perform the intra-frame HDR image generation process when there is any detectable motion of a subject.

Note that the image capturing apparatus 100 determines whether the intra-frame HDR image generation process is to be performed or the inter-frame HDR image generation process is to be performed, on a block basis. In this case, for example, each block of an H image (H-1) is composed with the corresponding block of the first L image (L-11) if a motion has been detected in the block, and the corresponding block of the third L image (L-21) if a motion has not been detected in the block.

Variation

Figure 12:
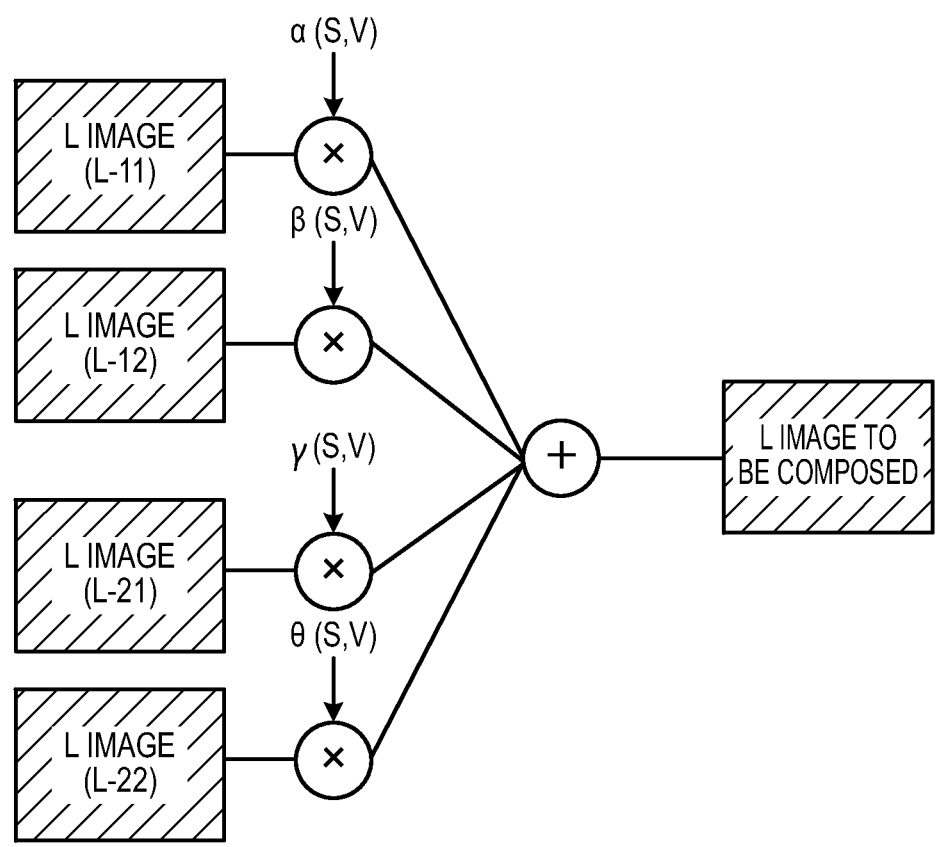
FIG. 12 is a diagram for describing a variation of the second embodiment.

Instead of switching between the intra-frame HDR image generation process and the inter-frame HDR image generation process, depending on the result of motion detection of a subject, the ratio of L images to be composed may be changed. For example, as shown in FIG. 12, the image capturing apparatus 100 may compose four L images together by calculating a weighted average thereof to generate a single L image for composition (image to be composed), and may compose the resultant L image with an H image. Weighting coefficients (α, β, γ, and θ) for L images are each a function of S (the number of blocks having a motion) and V (the direction of a motion), which are obtained by the motion detection process. This function is, for example, designed so that the values of α and β increase with an increase in a motion of a subject.

Note that, in this variation, the image capturing apparatus 100 does not need to compose all the four L images together. For example, an L image to be composed may be generated from the first and third L images (L-11 and L-21).

Third Embodiment

In the first and second embodiments, it has been assumed that when the intra-frame HDR image generation process is performed, any of a plurality of L images may be composed with an H image. However, when there is a motion of a subject, a plurality of L images are different from each other, and therefore, the image quality of an HDR image varies depending on which of the L images is composed with an H image. Therefore, in a third embodiment, an example will be described in which when the intra-frame HDR image generation process is performed, an L image to be composed is selected which is to improve the image quality of an HDR image. Note that, in the third embodiment, the image capturing apparatus 100 has a basic configuration similar to that of the first and second embodiments (see FIG. 1). Differences from the first and second embodiments will now be mainly described.

Figure 13:
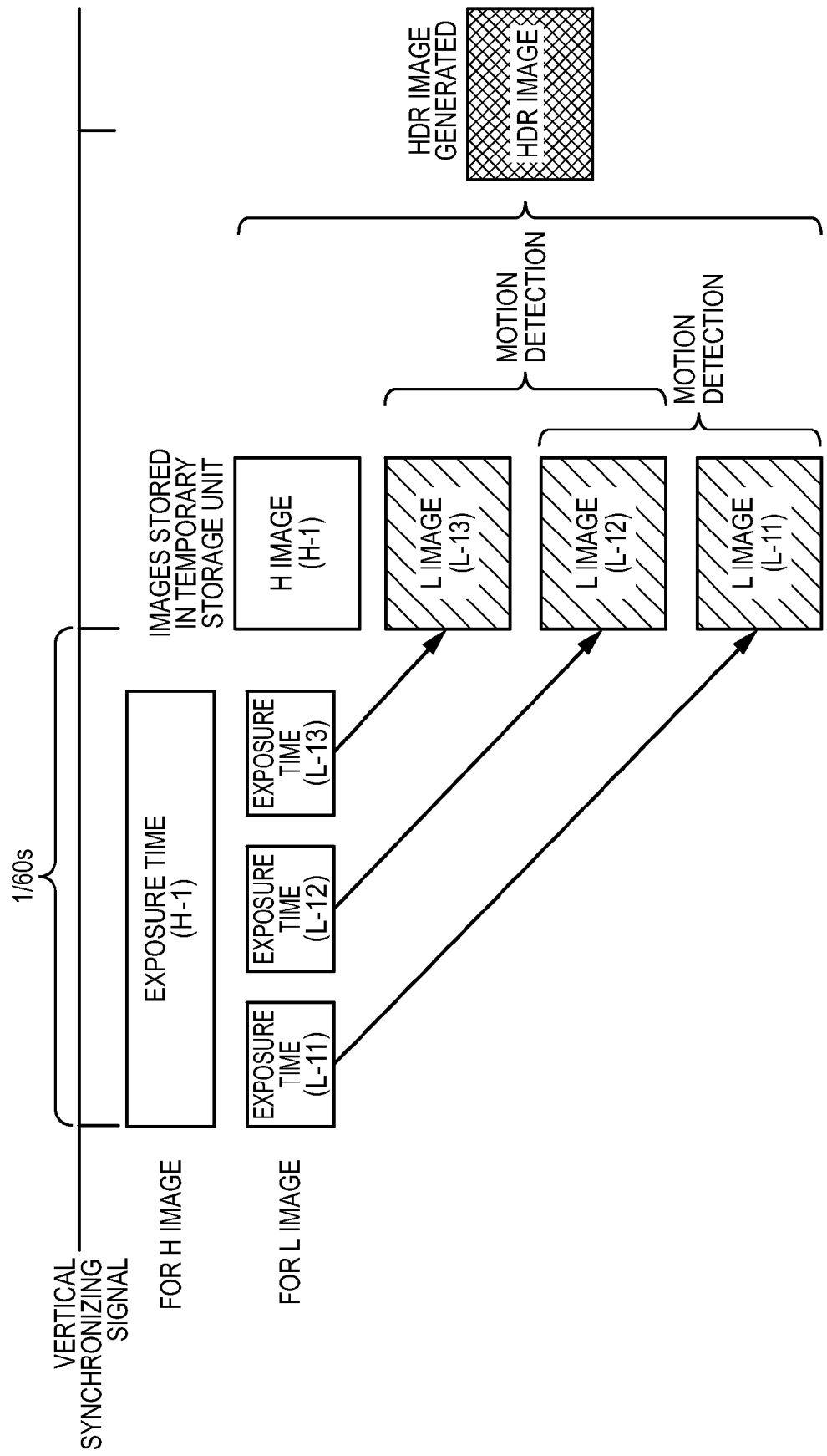
FIG. 13 is a timing chart where an HDR image is obtained using an image capturing apparatus 100 according to a third embodiment.

FIG. 13 is a timing chart where, in the third embodiment, an HDR image is obtained using the image capturing apparatus 100. As in the first embodiment, the image sensing device of the image capturing unit 103 can set exposure conditions for obtaining an L image and exposure conditions for obtaining an H image alternately in groups of two rows. The image capturing operation itself is performed at an image capturing rate of 60 fps based on a vertical synchronizing signal which is generated every 1/60 sec by the overall control/calculation unit 106. A captured image which is output from each row by the image sensing device after a predetermined exposure time has passed, is temporarily stored in the temporary storage unit 107.

In this embodiment, it is assumed that three L images (L-11, L-12, and L-13) are obtained at a timing when one H image is obtained. The third L image (fourth low-exposure image) is obtained by image capturing which is performed during a predetermined exposure time (fifth exposure time) which is shorter than the exposure time of the H image. When a predetermined number of L images for motion detection have been obtained, the motion detecting unit 108 attempts to detect a motion of a subject. Specifically, the motion detecting unit 108 calculates the number S of blocks having a motion and the direction of the motion V between the L images L-11 and L-12 and between the L images L-12 and L-13.

Figure 14:
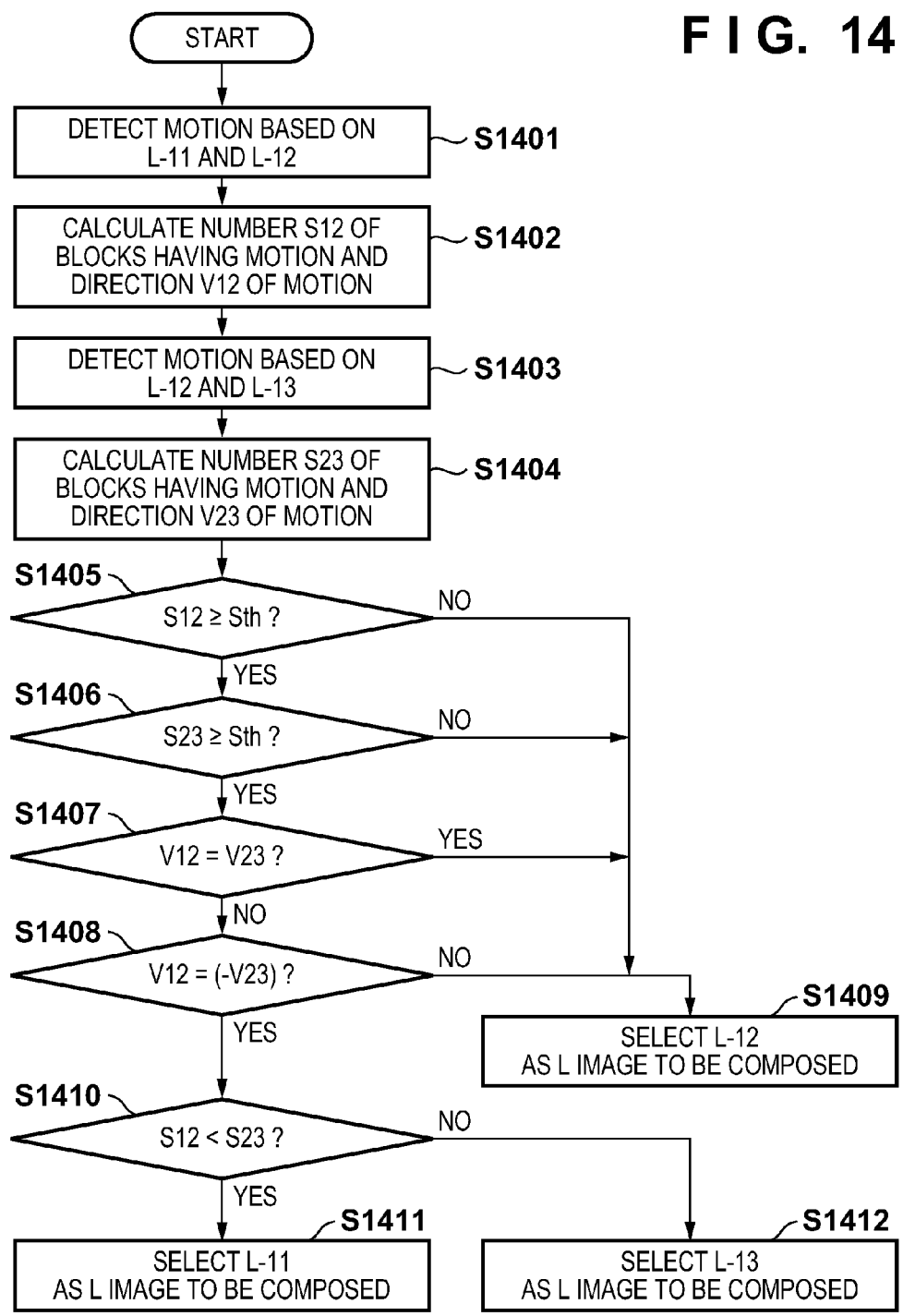
FIG. 14 is a flowchart showing a process of selecting an image which is used to generate an HDR image based on the result of motion detection according to the third embodiment.

FIG. 14 is a flowchart showing a process of selecting images based on which an HDR image is to be generated, using the result of motion detection, according to the third embodiment. In steps S1401 and S1402, the motion detecting unit 108 detects a motion between the first L image (L-11) and the second L image (L-12), and calculates the number S12 of blocks having the motion and the direction V12 of the motion (any of A to H of FIG. 7). Thereafter, in steps S1403 and S1404, the motion detecting unit 108 detects a motion between the second L image (L-12) and the third L image (L-13), and calculates the number S23 of blocks having the motion and the direction V23 of the motion (any of A to H of FIG. 7).

In steps S1405 and S1406, the overall control/calculation unit 106 determines whether or not S12 and S23 are not less than a predetermined threshold (Sth). If at least one of the values S12 and S23 is less than Sth, there is not a motion of a subject, at least either between L-11 and L-12 or between L-12 and L-13. In this case, control proceeds to step S1409, in which the overall control/calculation unit 106 selects, as an L image to be composed, L-12, which is the closest to the middle point in time of the three L images.

If none of S12 and S23 is less than Sth, a subject continues to move during a period of time in which the L images are obtained. In this case, the overall control/calculation unit 106 selects an L image to be composed for HDR based on the direction of the motion between the L images. Specifically, in step S1407, the overall control/calculation unit 106 determines whether or not V12=V23. If V12=V23, as shown in FIG. 15A the subject is moving in a constant direction. In this case, control proceeds to step S1409, in which the overall control/calculation unit 106 selects, as an L image to be composed, L-12, which is the closest to the middle point in time of the three L images.

If V12=V23 is not satisfied (in a case of V12≠V23), in step S1408 the overall control/calculation unit 106 determines whether or not V12=(−V23). If V12=(−V23) is not satisfied (V12 and V23 are not opposite directions), the direction of the motion of the subject is not a constant direction. In this case, control proceeds to step S1409, in which the overall control/calculation unit 106 selects, as an L image to be composed, L-12, which is the closest to the middle point in time of the three L images.

If V12=(−V23), as shown in FIG. 15B the direction of the motion of the subject is reversed halfway. In this case, in step S1410, the overall control/calculation unit 106 determines whether or not S12<S23. If S12<S23, control proceeds to step S1411, in which the overall control/calculation unit 106 selects L-11 as an L image to be composed. If S12<S23 is not satisfied, control proceeds to step S1412, in which the overall control/calculation unit 106 selects L-13 as an L image to be composed.

Note that the conditional branches of steps S1405 to S1410 are only for illustrative purposes, and an L image may be selected under different conditions. For example, in step S1408, even if V12≠(−V23), then when (V12=C or E or H) and (V23=A or D or F) (see FIG. 7) (i.e., the direction of a motion along the X coordinate is reversed), control may proceed to step S1410.

As described above, in this embodiment, the image capturing apparatus 100, when performing the intra-frame mode HDR image generation process, selects an L image to be composed based on the result of motion detection. As a result, the image quality of an HDR image can be improved.

Note that, this embodiment is also applicable when an L image or an H image captured in a different frame is used as an image to be composed. Motion detection may be performed based on not only L images but also a combination of a plurality of L images and an H image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-031428, filed on Feb. 20, 2013 which is hereby incorporated by reference herein in its entirety.

What is claimed is:

1. An image capturing apparatus comprising:
an image capturing unit configured to capture an image of a subject;
an image capturing control unit configured to perform image capturing using a first pixel group of the image capturing unit during a first exposure time to obtain a high-exposure image, perform image capturing using a second pixel group of the image capturing unit during a second exposure time which is shorter than the first exposure time to obtain a first low-exposure image, perform image capturing using the second pixel group during a third exposure time which is shorter than the first exposure time to obtain a second low-exposure image, the second and third exposure times at least partially overlapping the first exposure time, and perform image capturing using the first pixel group during a fourth exposure time which is shorter than the first exposure time after the high-exposure image has been obtained, to obtain a third low-exposure image;
a detection unit configured to compare the first low-exposure image with the second low-exposure image to detect a motion of the subject; and
a generation unit configured to compose the high-exposure image with at least one of the first, second, and third low-exposure images, based on the motion of the subject detected by the detection unit, to generate a high-dynamic-range (HDR) image,
wherein
the generation unit, when the detection unit has not detected a motion of the subject, composes the high-exposure image with the third low-exposure image to generate the HDR image.

2. The image capturing apparatus according to claim 1, wherein
the detection unit compares the first low-exposure image with the second low-exposure image in blocks of a predetermined size to detect a motion of the subject in each of the blocks, and the generation unit, when a number of blocks in which a motion of the subject has been detected is less than a threshold, composes the high-exposure image with the third low-exposure image to generate the HDR image.

3. The image capturing apparatus according to claim 1, wherein
pixels of the image capturing unit belong to the first or second pixel group alternately in groups of a predetermined number of rows.

4. The image capturing apparatus according to claim 1, wherein
the second exposure time is equal to the third exposure time.

5. An image capturing apparatus comprising:
an image capturing unit configured to capture an image of a subject;
an image capturing control unit configured to perform image capturing using a first pixel group of the image capturing unit during a first exposure time to obtain a high-exposure image, perform image capturing using a second pixel group of the image capturing unit during a second exposure time which is shorter than the first exposure time to obtain a first low-exposure image, perform image capturing using the second pixel group during a third exposure time which is shorter than the first exposure time to obtain a second low-exposure image, the second and third exposure times at least partially overlapping the first exposure time, and perform image capturing using the first pixel group during a fourth exposure time which is shorter than the first exposure time after the high-exposure image has been obtained, to obtain a third low-exposure image;
a detection unit configured to compare the first low-exposure image with the second low-exposure image to detect a motion of the subject; and
a generation unit configured to calculate a weighted average of the first, second, and third low-exposure images based on the motion of the subject detected by the detection unit to obtain a composite image, and compose the high-exposure image with the composite image, to generate a high-dynamic-range (HDR) image.

6. The image capturing apparatus according to claim 5, wherein
the detection unit compares the first low-exposure image with the second low-exposure image in blocks of a predetermined size to detect a motion of the subject in each of the blocks, and
the generation unit calculates the weighted average of the first, second, and third low-exposure images based on a number of blocks in which a motion of the subject has been detected.

7. An image capturing apparatus comprising:
an image capturing unit configured to capture an image of a subject;
an image capturing control unit configured to perform image capturing using a first pixel group of the image capturing unit during a first exposure time to obtain a high-exposure image, perform image capturing using a second pixel group of the image capturing unit during a second exposure time which is shorter than the first exposure time to obtain a first low-exposure image, perform image capturing using the second pixel group during a third exposure time which is shorter than the first exposure time to obtain a second low-exposure image, the second and third exposure times at least partially overlapping the first exposure time, and perform image capturing using the second pixel group during a fifth exposure time which is shorter than the first exposure time after the first and second low-exposure images have been obtained, to obtain a fourth low-exposure image;
a detection unit configured to compare the first low-exposure image with the second low-exposure image to detect a motion of the subject, and compare the second low-exposure image with the fourth low-exposure image to detect a motion of the subject; and
a generation unit configured to select one of the first, second, and fourth low-exposure images based on a result of the detection by the detection unit, and compose the selected low-exposure image with the high-exposure image to generate a high-dynamic-range (HDR) image.

8. The image capturing apparatus according to claim 7, wherein
the detection unit compares the first low-exposure image with the second low-exposure image in blocks of a predetermined size to detect a motion of the subject in each of the blocks, and compares the second low-exposure image with the fourth low-exposure image in blocks of a predetermined size to detect a motion of the subject in each of the blocks, and
the generation unit performs the selection of said one of the first, second, and fourth low-exposure images based on: a number of blocks in which a motion of the subject has been detected for the first and second low-exposure images; and a number of blocks in which a motion of the subject has been detected for the second and fourth low-exposure images.

9. A control method for an image capturing apparatus including an image capturing unit for capturing an image of a subject, comprising:
an image capturing control step of performing image capturing using a first pixel group of the image capturing unit during a first exposure time to obtain a high-exposure image, performing image capturing using a second pixel group of the image capturing unit during a second exposure time which is shorter than the first exposure time to obtain a first low-exposure image, performing image capturing using the second pixel group during a third exposure time which is shorter than the first exposure time to obtain a second low-exposure image, the second and third exposure times at least partially overlapping the first exposure time, and performing image capturing using the first pixel group during a fourth exposure time which is shorter than the first exposure time after the high-exposure image has been obtained, to obtain a third low-exposure image;
a detection step of comparing the first low-exposure image with the second low-exposure image to detect a motion of the subject; and
a generation step of composing the high-exposure image with at least one of the first, second, and third low-exposure images, based on the motion of the subject detected by the detection step, to generate a high-dynamic-range (HDR) image,
wherein
the generation step, when the detection step has not detected a motion of the subject, composes the high-exposure image with the third low-exposure image to generate the HDR image.

10. A non-transitory computer-readable storage medium storing a program for causing a computer to execute the control method according to claim 9.

11. A control method for an image capturing apparatus including an image capturing unit for capturing an image of a subject, comprising:

an image capturing control step of performing image capturing using a first pixel group of the image capturing unit during a first exposure time to obtain a high-exposure image, performing image capturing using a second pixel group of the image capturing unit during a second exposure time which is shorter than the first exposure time to obtain a first low-exposure image, performing image capturing using the second pixel group during a third exposure time which is shorter than the first exposure time to obtain a second low-exposure image, the second and third exposure times at least partially overlapping the first exposure time, and performing image capturing using the first pixel group during a fourth exposure time which is shorter than the first exposure time after the high-exposure image has been obtained, to obtain a third low-exposure image;

a detection step of comparing the first low-exposure image with the second low-exposure image to detect a motion of the subject; and a generation step of calculating a weighted average of the first, second, and third low-exposure images based on the motion of the subject detected by the detection step to obtain a composite image, and composing the high-exposure image with the composite image, to generate a high-dynamic-range (HDR) image.

12. A non-transitory computer-readable storage medium storing a program for causing a computer to execute the control method according to claim 11.

13. A control method for an image capturing apparatus including an image capturing unit for capturing an image of a subject, comprising:

an image capturing control step of performing image capturing using a first pixel group of the image capturing unit during a first exposure time to obtain a high-exposure image, performing image capturing using a second pixel group of the image capturing unit during a second exposure time which is shorter than the first exposure time to obtain a first low-exposure image, performing image capturing using the second pixel group during a third exposure time which is shorter than the first exposure time to obtain a second low-exposure image, the second and third exposure times at least partially overlapping the first exposure time, and performing image capturing using the second pixel group during a fifth exposure time which is shorter than the first exposure time after the first and second low-exposure images have been obtained, to obtain a fourth low-exposure image;

a detection step of comparing the first low-exposure image with the second low-exposure image to detect a motion of the subject, and comparing the second low-exposure image with the fourth low-exposure image to detect a motion of the subject; and a generation step of selecting one of the first, second, and fourth low-exposure images based on a result of the detection by the detection step, and composing the selected low-exposure image with the high-exposure image to generate a high-dynamic-range (HDR) image.

14. A non-transitory computer-readable storage medium storing a program for causing a computer to execute the control method according to claim 13.

* * * * *